ately as 100% pure styrene.

United States Patent Office 2,973,394
Patented Feb. 28, 1961

2,973,394

METHOD OF PURIFYING STYRENE

Edward R. Atkinson, Wellesley, and Jacob G. Mark and David Rubinstein, Brookline, Mass., assignors to W. R. Grace & Co., Cambridge, Mass., a corporation of Connecticut No Drawing. Filed Jan. 30, 1958, Ser. No. 712,091

9 Claims. (Cl. 260—669)

Styrene is commonly produced by the catalytic dehydrogenation of ethylbenzene. The crude dehydrogenated stream ordinarily contains about 40% styrene and 60% ethylbenzene, together with small amounts of toluene, benzene and tars. Purification or "finishing" of the styrene has constituted the chief stumbling block in the commercial production of styrene, because the major ingredients of the crude stream, i.e., styrene and ethylbenzene, boil within 9° C. of each other, and because of the high polymerization rate of styrene at elevated temperatures.

Special techniques have been worked out by which styrene can be separated from ethylbenzene by fractional distillation. These techniques involve vacuum distillation using a highly specialized column design, addition of elemental sulfur to the styrene to serve as a polymerization inhibitor, and above all the most scrupulously careful control of temperature. Although these procedures have made it possible to produce high quality styrene, their success depends on such specialized equipment and such careful control of conditions that the step of finishing styrene still remains the most difficult part of its production. Furthermore, some loss of styrene due to polymerization and to side reactions between styrene and the sulfur used as an inhibitor is inevitable.

In view of the increasingly large amounts of styrene which are being manufactured for use in the plastics industry, it is most important that a less difficult method of purification be found.

We have invented a method for the purification of styrene based on its chemical separation from ethylbenzene and the other constituents of the crude styrene stream. This process is conducted at very low temperatures, i.e., below 0° C., with the result that little if any tendency to polymerization is encountered. Furthermore, the purification can be carried out in relatively simple and inexpensive equipment and does not require the delicate adjustments and careful handling which are a necessary part of the older processes.

We have discovered that styrene reacts with cuprous chloride to form a solid compound which is stable below 35° C. and which is insoluble in the constituents of a crude styrene stream. Our new method for the purification of styrene has been developed as a result of this discovery. It is our belief that the reaction between styrene and cuprous chloride can be described as a dative bonding process and that the compound so formed belongs to the class of chemical compositions known as coordination compounds.

According to our invention, a crude stream containing styrene, ethylbenzene and small amounts of other hydrocarbons is mixed with cuprous chloride at low temperature and the mixture is stored for a length of time sufficient to allow absorption of the styrene by the cuprous chloride. The solid coordination compound of styrene and cuprous chloride is separated from the ethylbenzene and other unreacted hydrocarbons in the crude stream by filtration, and the precipitate is washed to insure complete separation. The coordination compound is then decomposed by heating it to a temperature above 35° C., and pure styrene is recovered.

Example I

A charge consisting of 400 grams of a 40% styrene-60% ethylbenzene stream was precooled to −15° C. and mixed with 100 grams of C.P. cuprous chloride, also precooled. The reaction mixture grew stiff within eight minutes and heat was evolved. The stiff reaction mixture was then stored at −15° C. for 24 hours to allow the reaction to proceed to completion.

Following the storage period, the reaction mixture was transferred to a cold suction funnel and the precipitate was sucked as dry as possible. The filter cake was then washed on the filter by stirring with 300 cc. of n-pentane at −10° C., sucked dry, and washed a second time, using 200 cc. of cold pentane. The combined filtrates, containing pentane and a mixture of unabsorbed styrene and ethylbenzene, were subjected to fractional distillation. Pentane was recovered for reuse and the mixture of ethylbenzene and unabsorbed styrene could be returned to the mixed stream source if desired.

The washed styrene-cuprous chloride compound was then mixed with 300 cc. of pentane and the temperature of the mixture was raised to at least 35° C., the temperature of decomposition of the coordination compound. Styrene was released and could then be separated from the pentane by simple distillation. By this process, 39% of the styrene contained in the mixed stream was recovered as 100% pure styrene. The cuprous chloride which was liberated in the last step was available for reuse.

As indicated above, 24 hours was allowed for the absorption reation to proceed to completion. It is possible, however, to recover substantial amounts of styrene in much shorter times. For example, the reaction of Example I was interrupted after only 1 hour, with a recovery of 33% of the styrene in the original charge; when it was allowed to proceed for 3 hours, 34.5% of the styrene was recovered.

The above method has been used successfully with hydrocarbon streams containing 40% or more of styrene. However, when more dilute streams containing, for example, 20% of styrene are mixed with cuprous chloride, no styrene-cuprous chloride coordination compound is formed, even after prolonged storage at −15° C.

We have discovered that this reaction can be promoted by the use of certain catalysts, namely, the lower straight-chain alcohols, methyl alcohol, ethyl alcohol, and n-propyl alcohol. When such a catalyst is added to the reaction mixture, styrene is absorbed even from very dilute streams, and the insoluble styrene-cuprous chloride compound is formed. By this means, a satisfactory separation can be made from dilute streams.

Example II

When a charge of 400 grams of a 20% styrene stream was treated with 100 grams of C.P. cuprous chloride at −15° C. for 20 hours, there was no reaction between the styrene and the cuprous chloride. However, when 10 cc. of methyl alcohol was added to the reaction mixture, the solid styrene-cuprous chloride compound formed and was treated as described in Example I. In the final step of the process, 32.5% of the styrene in the original charge was recovered as 99% styrene.

For styrene assay we have use a spectroscopic method of analysis, measuring the absorption of ultraviolet light at a wave length at which there is no interference from ethylbenzene. A Beckman Model DU spectrophotometer was used and solutions in purified methyl alcohol containing about $7 \times 10^{-3}$ grams of styrene per liter were examined at 290 millimicrons with solvent as a reference standard. The method was standardized against pure styrene and the standardization checked by occasional measurement of samples in spectro-grade iso-octane with use of the literature constant for styrene in this solvent.

The optimum amount of alcohol was found to be 2.5 cc. for every 100 g. of hydrocarbon charge or 2% by weight figured on the hydrocarbon charge. Increasing the amount of catalyst did not result in an appreciable increase in the efficiency of the process. When the proportion of catalyst was decreased below 1%, however, the catalytic effect was negligible.

It is interesting to note that the use of a catalyst in Example I (40% styrene stream) did not increase the amount of styrene which could be recovered, nor did it decrease the time necessary for the reaction to any important extent. Apparently the importance of the catalysts in this reaction is that they make it possible to recover styrene from very dilute streams.

There are many organic solvents other than pentane which may be used in our process, for example, benzene, toluene, carbon tetrachloride, acetone, hexane, heptane, and other solvents which are known to dissolve or to be miscible with ethylbenzene and the other hydrocarbon materials which may be encountered in the crude ethylbenzene-styrene stream. The most important requirement for the solvent is that its boiling point be substantially different from that of styrene in order to make the separation in the last step of the process as simple as possible.

The copper salt used as an absorbent for the styrene may be any solid monovalent copper salt, for example, cuprous chloride, cuprous nitrate, cuprous sulfate, cuprous phosphate, cuprous formate, etc. The corresponding silver salts may also be used.

Our experiments have led us to the conclusion that the quantity of styrene absorbed corresponds to two moles of styrene per mole of cuprous chloride ($Cu_2Cl_2$). We have found, in addition, that C.P. cuprous chloride has far greater absorptive capacity than the technical grade, even when the latter is very finely ground. In general, we have found the purity of the absorbent more important than its state of subdivision.

Certain other vinyl-substituted aromatic compounds, analogous to styrene, have been found to react with cuprous or silver salts to form insoluble coordination compounds. This reaction may be used as the basis of a process for their purification.

A mixture of meta- and para-methyl styrenes, or as it is more commonly known, vinyltoluene, is manufactured by dehydrogenation of a mixture of the isomeric meta- and para-ethyltoluenes. Purification of the crude dehydrogenated material by distillation is a very difficult procedure, in fact even more difficult than the finishing of styrene. It is of advantage, therefore, to be able to make a chemical separation of vinytoluene from ethyltoluene.

We have found that vinyltoluene forms a solid coordination compounds with cuprous chloride at temperatures ranging from 0° C. to 15° C. This compound decomposes when warmed to 20° C. and is insoluble in ethyltoluene. It is less stable than the corresponding styrene compound. We have been able to purify vinyltoluene by a technique similar to that described above for the purification of styrene, but with lower yields of purified material due to the lower stability of the vinyltoluene-cuprous chloride compound.

Example III

A charge consisting of 800 grams of a 70% vinyltoluene-30% ethyltoluene stream was precooled to −15° C. and mixed with 100 grams of cuprous chloride. The mixture grew very stiff, indicating formation of the coordination compound. The filtering, washing and decomposition of the coordination compound were carried out according to the procedure of Example I. In the final steps of the process, 12% of the vinyltoluene in the charge was recovered as 94% pure material. This amount of vinyltoluene was found to be chemically equivalent to the weight of cuprous chloride used.

The reaction between vinyltoluene and cuprous chloride caused excessive stiffening of the reaction mixture. The much larger hydrocarbon charge was used in Example III in order to preserve sufficient fluidity so that the reaction mixture could be handled.

Mixtures of vinyltoluene and ethyltoluene containing significantly smaller amounts of vinyltoluene, for example, 40% vinyltoluene, did not form a coordination compound when mixed with cuprous chloride, nor did the use of the lower alcohols, i.e., methyl alcohol, ethyl alcohol or n-propyl alcohol catalyze the process. This is believed to be due to the unstable nature of the vinyltoluene-cuprous chloride compound.

Divinylbenzene is manufactured by the catalytic dehydrogenation of an isomeric mixture of diethylbenzenes, and the divinylbenzene sold commercial is actually a mixture of divinylbenzene and ethylvinylbenzene. Fractional distillation is ordinarily used to separate the divinylbenzene-ethylvinylbenzene mixture from the unchanged diethylbenzenes. The chief difficulty in this separation is the possibility of partial or complete gelation of the mixture being distilled. Since divinylbenzene is a difunctional monomer, even a low degree of polymerization may yield an insoluble or gelled polymer which may block the distillation system and require the system to be shut down for cleaning.

We have found that a solid coordination compound of the divinylbenzene-ethylvinylbenzene mixture and cuprous chloride forms at between 25° C. and 30° C., decomposes at 75° C., and is insoluble in the diethylbenzenes present in the crude stream. This coordination compound may be used as the basis for a purification process similar to that described in Example III.

We claim:

1. A process for the separation of a vinyl-substituted aromatic compound from a mixed hydrocarbon stream which includes the steps of mixing the hydrocarbon stream with a solid, undissolved monovalent salt of a metal selected from the group consisting of copper and silver under conditions such as to form a solid coordination compound of the said vinyl-substituted aromatic compound and the said monovalent salt, removing the unreacted hydrocarbon from the mixture and thereafter heating the solid coordination compound in order to cause decomposition thereof and to recover the vinyl-substituted aromatic compound.

2. A process according to claim 1 which includes the step of adding to the reaction mixture as a catalyst for the absorption reaction a minor proportion of a lower alcohol selected from the group consisting of methyl alcohol, ethyl alcohol and n-propyl alcohol.

3. A process according to claim 2 in which the catalyst is methyl alcohol.

4. A process according to claim 2 in which the catalyst is ethyl alcohol.

5. A process according to claim 2 in which the catalyst is n-propyl alcohol.

6. A process for the separation of a vinyl-substituted aromatic compound selected from the group consisting of styrene, vinyltoluene, divinylbenzene and ethylvinylbenzene from a mixed hydrocarbon stream, which includes the steps of mixing the hydrocarbon stream with a solid monovalent salt of a metal selected from the group consisting of copper and silver at a temperature at least as low as 0° C., and for a time sufficient for the formation of the solid coordination compound of the said vinyl-substituted aromatic compound and the said monovalent salt, filtering the reaction mixture to remove unreacted hydrocarbon from the solid coordination compound, washing the solid coordination compound with a solvent for the unreacted hydrocarbons, the temperature of said solvent being at least as low as 0° C., filtering the mixture to remove the solvent and the unreacted hydrocarbons dissolved therein from the solid coordination compound, heating the said solid coordination compound with an organic liquid which is miscible with the said vinyl-substituted aromatic compound in order to decompose the said coordination compound, and thereafter separating the vinyl-substituted aromatic compound from the organic liquid by distillation.

7. A process according to claim 6 which includes the step of adding to the reaction mixture a minor proportion of a lower alcohol selected from the group consisting of methyl alcohol, ethyl alcohol, and n-propyl alcohol.

8. A process for the separation of styrene from ethylbenzene which includes the steps of reacting the styrene-ethylbenzene mixture with solid cuprous chloride for about 24 hours at a temperature of about −15° C., in order to form the solid coordination compound of styrene and cuprous chloride, filtering the reaction mixture to remove unreacted hydrocarbons from the solid coordination compound, washing the solid coordination compound with pentane at a temperature of about −10° C., filtering off the pentane with the ethylbenzene and unreacted styrene dissolved therein, heating the said coordination compound with a further quantity of pentane to decompose the coordination compound, and thereafter separating the styrene from the pentane by distillation.

9. A process according to claim 8 in which the proportion of styrene in the styrene-ethylbenzene mixture is less than 40% and a minor proportion of methyl alcohol is added to the mixture to act as a catalyst.

References Cited in the file of this patent

UNITED STATES PATENTS

| | | |
|---|---|---|
| 2,377,221 | Francis et al. | May 29, 1945 |
| 2,386,200 | Drennan | Oct. 9, 1945 |
| 2,389,647 | Soday | Nov. 27, 1945 |
| 2,411,105 | Nixon | Nov. 12, 1946 |
| 2,561,822 | Savoy | July 24, 1951 |
| 2,730,486 | Coonradt et al. | Jan. 10, 1956 |
| 2,865,970 | Thomas | Dec. 23, 1958 |